:::[19] United States Patent
Hirosawa

[11] 3,917,702
[45] Nov. 4, 1975

[54] METHOD FOR MAKING LIQUID RESINOUS CURING AGENTS FOR EPOXY RESINS AND THE PRODUCTS THEREOF

[75] Inventor: Frank N. Hirosawa, Monterey Park, Calif.

[73] Assignee: Furane Plastics Incorporated, Los Angeles, Calif.

[22] Filed: June 6, 1969

[21] Appl. No.: 831,203

Related U.S. Application Data

[63] Continuation-in-part of Ser. No. 684,926, Nov. 21, 1967, abandoned.

[52] U.S. Cl. .......... 260/570 D; 260/2 EC; 260/2 N; 260/347.7; 260/391; 260/397.6
[51] Int. Cl.² ........................................ C07C 87/28
[58] Field of Search ...... 260/570 D, 397.6; 252/184

[56] References Cited
UNITED STATES PATENTS

| | | | |
|---|---|---|---|
| 2,683,730 | 7/1954 | Seeger et al. | 260/453 |
| 3,012,008 | 12/1961 | Lister | 260/75 |
| 3,097,191 | 7/1963 | France et al. | 260/77.5 |
| 3,459,781 | 8/1969 | Hoeschele | 260/570 X |
| 3,488,374 | 1/1970 | Kober et al. | 260/570 X |

*Primary Examiner*—R. V. Hines
*Attorney, Agent, or Firm*—Miner L. Hartmann

[57] ABSTRACT

A curing agent for epoxy resins is made by processing an aromatic polyamine with an active aldehyde compound under reaction conditions and proportions of ingredients which yield curing agents which are liquid at ambient temperatures. These liquid curing agents, after mixing with uncured epoxy resins, have a long working life at ambient temperatures, and when the mixtures are cured, have unusual resistance to high temperatures.

9 Claims, No Drawings

METHOD FOR MAKING LIQUID RESINOUS CURING AGENTS FOR EPOXY RESINS AND THE PRODUCTS THEREOF

CROSS REFERENCES TO RELATED APPLICATIONS

This application is a continuation in part of my copending application Ser. No. 684,926 filed Nov. 21, 1967, and now abandoned.

BACKGROUND OF THE INVENTION

This invention relates to curing agents for epoxy resin compositions and in particular to a liquid reaction product of an aromatic polyamine with certain organic compounds having an active aldehyde group.

The aromatic diamines were introduced at an early date into the epoxy resin technology in order to provide improved heat and chemical resistance over that obtained with the aliphatic amines. They have been used with success in laminating applications for the early days, and find limited use in casting and adhesive applications, where their improved properties warrant the handling difficulties involved. Aromatic polyamines and ketone or aldehyde condensation products have been investigated as curing agents for epoxy resins, but these aromatic polyamines and their derivatives are invariably solids, which has limited their utility. The initial mixing with the liquid epoxy resins is sometimes effected by powdering the solid curing agent, but even then, the material must eventually be melted to become uniformly dispersed in the epoxy resin, for complete curing, and this heating shortens the working life considerably and at times the mixture sets to an insoluble, infusible polymer before it can even be mixed properly.

These solid aromatic polyamines and their derivatives have been converted to liquid form by different techniques: (a) melting and supercooling, (b) eutectic mixtures, (c) adduct formation, and (d) modifying with various liquid polyamines or solvents. These techniques yield properties for most practical purposes equal to or much lower than the original aromatic polyamines alone: e.g., heat distortion temperature of only about 300° F.

The principal object of the invention is to provide a cured epoxy resin composition which has high heat-stability — an increase of 50 to 100 percent over the usual epoxy resin stability temperature, that is, over 500° F.

Another object is to provide a curable epoxy resin composition which has a long working life of the order of eight or more hours at ordinary temperatures.

Another object is to provide a new resinous liquid curing agent for easy, uniform mixing with the epoxy resin, which on curing results in the attainment of the optimum properties.

A further object is to provide a liquid epoxy curing agent whose viscosity can be controlled over a wide range, and whose use in curing epoxy resin compositions results in high heat stability, long working life, and ease of use and of curing.

The present invention is applicable to epoxies in general. The term epoxy as here used means an organic molecule comprising an oxygen atom joined to each of two carbon atoms which are already united in some other way, as

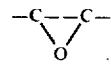

Any epoxy resin may be defined as an organic compound containing more than one of these epoxy groups. These groups may be terminal glycidyl, terminal glycidyl ether, internal epoxy, and ring situated epoxy. For the most part these resins are glycidyl ether type of condensation polymers having the following general formula:

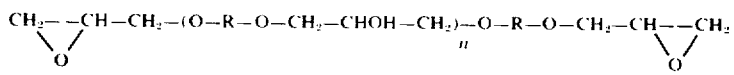

wherein $n$ represents 0 or integer up to 15 and R represents the divalent radical of a poly hydroxy compound such as 2,2'-bis-(4-hydroxyphenyl)propane (bisphenol-A), bis-(4-hydroxy-phenyl)-2,2'-butane, bis(4-hydroxyphenyl)-4,4'4,4'-pentanoic acid, di(2,3-hydroxy butyl) adipate, di(2,3-hydroxy propyl) phthalate, tetra bromobis-phenol-A, catechol, resorcinol, pyrogallol, phloroglucinol, etc. These products are obtained commercially by condensing epichlorohydrin with one of the aforesaid poly hydroxy compounds, usually bisphenol-A, in the presence of caustic alkali. Epoxy resins may be characterized further by reference to their epoxy equivalent, the epoxy equivalent of epoxy resins being the mean molecular weight of the resin divided by the number of epoxy radicals per molecule. By synthesizing epoxy resins having a high epoxy and a high cross-linked density, it is possible to produce materials with improved mechanical, chemical, electrical and thermal properties.

Other epoxides also suitable for use in this invention, either alone or in combination with the glycidyl ether condensation polymers, are epoxy-novolacs, comprising the numerous epoxidized phenols, cresols, and xylenols and their resins, cycloaliphatic based epoxides, such as, limonene dioxide, bis (2,3-epoxy cyclopentyl)ether, vinyl cyclohexene dioxide, 3,4-epoxy-6-methylcyclohexylmethyl -3,4-epoxy-6-methyl cyclohexane carboxylate, bis (3,4-epoxy-6-methyl cyclohexyl methyl)adipate, dicyclopentadiene dioxide, bis epoxy dicyclopentylether of ethylene glycol, and the like. The aforementioned cycloaliphatic epoxies are prepared by the peracetic acid epoxidation of cyclic olefins. The principal characteristic of the cycloaliphatic epoxides is their high temperature resistance resulting from their compact molelcular structure.

I have discovered, that by suitable reaction procedures, aromatic polyamine may be combined with organic compounds containing active aldehyde

groups to produce a curing agent of complex undetermined structure which may have at room temperature a selected viscosity ranging from a few hundred centipoises to an almost solid compound and, which will impart the desired heat resistant properties to the finished infusible epoxy composition. I have further discovered that the viscosity of this new and novel curing agent may be controlled by varying the ratio of the aromatic polyamine to active aldehyde compounds, or by varying the composition of either the amines or other aldehyde compounds, or by the use of mixtures of several ingredients, or by a combination of these variations. By the use of the new resinous liquid curing agent I may provide a curable epoxy resin system that has a working life of at least eight hours at ambient temperature.

By the term "active aldehyde" as used herein, it is intended to include aldehyde compounds which have at least one atom of hydrogen attached to the carbon atom of the reactive carbonyl group

where R is an alkyl, cycloalkyl, aryl, arakyl, or alkalene hydrocarbon group, or hydrogen.

In particular, I have discovered that this new epoxy curing agent may be produced by pre-reacting a mixture of aromatic polyamines and active aldehyde compounds, by which there is formed a complex mixture or compound of undetermined structure which does not crystallize out of the reacting solution due to its novel resinous structure. Water is liberated in the reaction, and there is an increase in viscosity, dependent upon the type of diamine, aldehyde compound and proportion which is used in the reaction, the catalyst employed in the reaction, and the time and temperature of the reaction.

The ratio of aromatic polyamine to aldehyde compound is selected so that the desired viscosity of the curing agent may be obtained. The preferred mole ratio is in the range of 1.5 to 1.0 to the range of 10:1 by weight of the selected aromatic polyamine to the selected aldehyde compound, based upon the final mixture.

The aromatic polyamines which have been found useful for the preparation of this resinous curing agent by the method of this invention, include those in Table I.

TABLE I

| | |
|---|---|
| m-Phenylene diamine | 2,4-Diaminodiphenylamine |
| o-Phenylene diamine | 4,4'-Diaminophenylether |
| p-Phenylene diamine | 4,4'-Diamino diphenyl sulfone |
| 2,5-Diaminotoluene | 4,4'-Diamino benzophenone |
| 1,3-Diaminotoluene | 4,4'-Diamino diphenylamine |
| 1,8-Diaminonaphthalene | 4-methoxy-m-phenylenediamine |
| 4,4'Methylene dianiline | 4-Methoxy-6-methyl-m- |
| p-Chloro-o-phenylenediamine | phenylenediamine |
| | 4,4',4''-Triaminotriphenyl- |
| | methane |

Examples of the genus or class designated as active aldehyde compounds which may be employed in accordance with the present invention, are shown in Table II.

TABLE II

| | | |
|---|---|---|
| Formaldehyde | Caproaldehyde | Toluic aldehyde |
| Acetaldehyde | Caprylicaldehyde | Benzaldehyde |
| Propionaldehyde | Acrolein | Naphthaldehyde |
| Butyaldehyde | Crotonaldehyde | Phenanthaldehyde |
| n-Valeraldehyde | Tiglic aldehyde | Furfuraldehyde |

For the preparation of my novel resinous hardener composition, in general, the appropriate amount of an aromatic polyamine was dissolved in a suitable solvent, such as water, iso-propyl alcohol, and an appropriate amount of the aldehyde compound was slowly added over a period ranging from 5 to 60 minutes. After the completion of the first stage of the reaction, the mass was heated to 120° – 200° C. to complete the reaction, and the water formed in the reaction together with the solvent used was distilled off, e.g., under reduced pressure (10 – 50 mm Hg.) to a pot temperature of 120° – 200° C. In some cases it was found desirable to use small amounts of an accelerator or catalyst to facilitate the reaction. Among the catalysts which may be used for these reactions are: acids, such as formic acid, acetic acid, hydrochloric acid; and alkalis such as barium hydroxide, calcium hydroxide, potassium hydroxide, sodium hydroxide.

The following are illustrative examples of the preparation of the resinuous liquid curing agent of this invention, and of the use of such a curing agent for reacting with epoxy compounds to form infusible resinous compounds that have excellent oxidative and thermal stability at high temperatures:

EXAMPLE I

Four hundred and thirty-two grams of m-phenylenediamine and 432 gm. distilled water were placed in a 2-liter three-neck flask equipped with a heating mantle, stirrer, thermometer, dropping funnel and vacuum distillation apparatus. The mixture was heated to 30° C. to dissolve the m-phenylenediamine and 162 gm. of 35% aqueous formaldehyde solution and 10 gm. of 36% hydrochloric acid solution was slowly added over a period of 30 minutes; cooled as necessary to keep the addition temperature between 30° – 35° C. After the final addition of formaldehyde solution, the mixture was stirred for an additional 30 minutes at a temperature of 30° – 35° C.

The first addition temperature is not limited to 35° C.; study shows that the addition temperature may be from 0° C. to 100° C. Although the viscosity of the hardener was higher when using a higher initial reaction temperature, these hardeners cured the epoxy resin equally well and the final product obtained was equally resistant to oxidative and thermal degradation.

An additional 432 gm. of m-phenylenediamine was then added and the mixture heated to 150° C. over a period of two hours under a reduced pressure of 45 mm. Hg., recovering 568 gm. of distillate, which is equivalent to water of reaction and total added water. The product was neutralized with sodium hydroxide solution and distilled under reduced pressure to remove the water, and the boiler residue filtered hot through a filter-aid bed, to remove residual salt.

The product was light brown in color and had a Brookfield viscosity of approximately 600 poises at 25° C. 10 to 15 parts of this hardener or curing agent was mixed with 100 parts of an epoxy resin derived from bisphenol A and epichlorohydrin, having an epoxy equivalent of about 190. 100 grams of resin and hardener mixed together had a working life of more than 24 hours at 77° F. The cured resin had a Shore "D" hardness at 90 at 400°F. For comparison the same epoxy resin cured with 10 to 15 parts by weight of m-phenylenediamine showed a Shore "D" hardness of about 65 at 400° F.

EXAMPLE II

Two hundred and sixteen grams of m-phenylene-diamine and 218 grams of .5 to 20% sodium hydroxide solution were placed in a 500 ml. three-neck flask equipped with a heating mantle, stirrer, thermometer, dropping funnel and vacuum distillation apparatus. The mixture was heated to 30° C. to dissolve m-phenylenediamine and 81 gm. of 37% aqueous formaldehyde solution was slowly added over a period of 30 minutes, cooling as necessary to keep the addition temperature between 30° – 35° C. The mixture was then phase separated to remove the upper aqueous alkaline solution. An additional 300 gm. of m-phenylenediamine was then added and the mixture heated to 150° C. over a period of one hour under a reduced pressure of 45 mm mercury, to remove the water of reaction.

The product was then filtered hot through a filter-aid bed, to remove the residual insoluble solids.

The product was light brown in color and had a Brookfield viscosity of 350 poises at 25° C. Recovery was 438 gm. or 98.5% of the theoretical yield.

Ten to fifteen parts of this hardener was mixed with 100 parts of an epoxy resin derived from bisphenol A and epichlorohydrin, having an epoxy equivalent of about 190. The mixture (100 gm.) had a working life of better than 24 hours at ambient temperatures. The mixture was heated one hour at 200° F., one hour at 300° F. and two hours at 400° F. The test samples were placed in a circulating air oven heated at 400° F. The compound was extremely resistant to oxidative and thermal degradation. A comparable compound cure with untreated m-phenylenediamine had a Shore "D" hardness of 60 at 400° F., and one week aging in a 400° F. air circulating oven the Shore "D" hardness dropped to 35.

The resinous liquid hardener of this experiment was also used to cure a mixture of glycidyl ethers of bisphenol A (low and high molecular weight) and vinyl cyclohexene dioxide to yield compounds with heat distortion temperatures above 500° F.

EXAMPLE III

Following the procedure described in Example I and II, an experiment was run without the catalyst, and a product of a light brown color was obtained with a higher Brookfield viscosity of 680 poises at 25° C.

Twelve to fifteen parts of this hardener were mixed with 100 parts of an epoxy resin derived from bisphenol A and epichlorohydrin, having an epoxy equivalent of 190. The hardener-epoxy resin mixture was cured one hour at 250° F., two hours at 300° F., and two hours at 400° F. The Shore "D" hardness at 400° F. was 83. Long time aging at 400° F. showed no sign of thermal degradation.

Although solubility of the hardener in the epoxy resin and the viscosity differed considerably from one catalyst to another and one without catalyst, these hardeners cured the epoxy resin equally well, and the final product obtained was extremely resistant to oxidative and thermal degradation. Further heating in the preparation of the curing agent yielded more viscous, higher molecular weight derivative which were equally effective in curing diglycidyl ethers of bisphenol A and cycloaliphatic diepoxides.

EXAMPLE IV

Two hundred and sixteen grams of m-phenylene diamine were placed in a liter three-neck flask equipped with a heating mantle, stirrer, thermometer, dropping funnel and vacuum distillation apparatus. To this was added 216 gm. of a dilute sodium hydroxide solution with good agitation. This mixture was heated to 30° C. to dissolve the amine and 81 gm. of 37% formalin were added slowly over a period of 30 minutes. The addition temperature was 30° – 35° C., and after the final addition of formalin, the mixture was stirred for an additional 30 minutes at a temperature of 30° – 35° C. The mixture of resinous material and upper aqueous caustic solution was separated and the aqueous alkali was removed as much as possible. An additional 432 gm. of m-phenylenediamine were then added in one operation and the mixture was heated to 150° C. over a period of one hour under a reduced pressure of 45 mm mercury.

The product obtained was light brown in color and had a Brookfield viscosity of 70 poises at 25° C.

Thirteen to fifteen parts of this hardener was mixed with 100 parts of an epoxy resin having an epoxy equivalent of 190. The mixture of hardener and resin (100 grams) had a working life of approximately 10 hours at 77° F. The completely cured sample had a Shore "D" hardness of 75 at 400° F.

EXAMPLE V

Following the procedure described in Example I, the 37% formalin was substituted, mole for mole, by a 55% methanol solution of formaldehyde (Methyl Formcel 55% of Celanese Chemical Company).

The product obtained was light brown in color and had a Brookfield viscosity of 350 poises at 25° C. The resinous liquid curing agent was used further to cure epoxy resins as noted in the paragraph below.

Ten to fifteen parts of this hardener was mixed with 100 parts of an epoxy resin derived from bisphenol A and epichlorohydrin, having an epoxy equivalent of 190. The resin and hardener mixture (100 gm.) had a working life of approximately 24 hours at 77° F. The resin-hardener mixture was heated for two hours at 200°F., two hours at 300°F., and four hours at 400°F., to produce a casting having a heat distortion temperature of 415°F. and a Shore "D" hardness of better than 85 at 400°F.

Following the procedure of Example II, a very similar product was obtained, and it hardening effect on an epoxy resin was substantially the same.

EXAMPLE VI

The effect of a single step cook on the final product was examined. Four hundred and thirty-two grams (4 moles) of m-phenylene-diamine, 216 gm. of dilute sodium hydroxide solution were placed in a reactor vessel and 54.5 gm. of "Methyl Formcel 55%" were reacted at 30° – 35°C. for a period of one hour. This mixture was then heated to 150°C. over a period of two hours under reduced pressure to remove the water.

The product obtained was light brown in color and had a Brookfield viscosity of 625 poises at 25° C.

Twelve to fifteen parts of this hardener was mixed with 100 parts of an epoxy resin (eq. w. 190) and heated to obtain a complete cure. The cured sample had a Shore "D" hardness of 84 at 400°F.

The preceding examples indicate that the method of cook or catalyst used had little effect on the final high temperature properties. However, the solubility of the hardener in the epoxy resin becomes more difficult as the viscosity of the hardener increases.

It has been determined that the viscosity of the new resinous liquid curing agent has little effect on the stoichiometry of the curing agent, i.e., the amine equivalent of the curing agent apparently stays fairly constant through the lower viscosity to the higher viscosity resinous state.

EXAMPLE VII

Following the procedure described in Example I, m-phenylenediamine was replaced by 4,4'-methylenedianiline in the second step addition before the final heat reaction and distillation under reduced pressure.

The product obtained was amber in color and had a Brookfield viscosity of 250 poises at 25° C.

Seventeen to nineteen parts of this hardener was mixed with 100 parts of epoxy resin (eq. w. 190). The cured resin had a Shore "D" hardness of 75 at 400°F. This was Shore "D" increase of 50% over the 4,4'-methylenedianiline alone.

Using the same ingredients with sodium hydroxide as the catalyst, as in Experiment II, gave a substantially identical product.

EXAMPLE VIII

Following the procedure described in Example VII, 4,4'-methylenedianiline was replaced by 2,4-diaminodiphenylamine. The products using a catalyst of hydrochloric acid and of sodium hydroxide were substantially identical.

The product obtained was dark blue, almost black in color, and had a Brookfield viscosity of 800 poises at 25° C.

Seventeen to twenty parts of this hardener and 100 parts of an epoxy resin (eq. w. 190) was mixed together and cured at 400°F. The product obtained had a Shore "D" hardness of better than 90 at 400°F.

EXAMPLE IX

Following the procedure described in Example VII, 4,4'-methylenedianiline was replaced with a mixture of m-phenylenediamine (114 gm.), o-phenylenediamine (22 gm.) and 2,4-diaminodiphenylamine (146 gm.). The products using a catalyst of hydrochloric acid and of sodium hydroxide were substantially the same.

The product obtained was a dark blue resinuous liquid hardener and had a Brookfield viscosity of 150 poises at 25°C.

Sixteen to eighteen parts of this hardener and 100 parts of an epoxy resin (eq. w. 190) mixed together, produced a product similar to Example VIII.

EXAMPLE X

Following the procedure described in Example I, m-phenylenediamine was replaced by 4,4'-methylenedianiline, mole for mole, and the reaction solvent was replaced with isopropyl alcohol. The product obtained was light tan in color and had a Brookfield viscosity of 800 poises at 25°C.

Following the procedure of Example II, the product using as the reaction solvent, isopropyl alcohol, had substantially the same properties.

Twenty to twenty-seven parts of this hardener was mixed with 100 parts of an epoxy resin (eq. w. 190) and after curing, yielded an infusible epoxy resin with a Shore "D" hardness of 65 at 400°F.

EXAMPLE XI

Following the procedure described in Example I, m-phenylenediamine was replaced by a mixture of m-phenylenediamine (162 gm.) and 4,4'-methylenedianiline (106 gm.). The product obtained was tan in color and had a Brookfield viscosity of 190 poises at 25°C. Using sodium hydroxide as the catalyst gave substantially identical results.

Nineteen parts of this hardener was mixed with 100 parts of an epoxy resin (eq. w. 190) and after curing, yielded an infusible resin with a Shore "D" hardness of 75 at 400°F.

EXAMPLE XII

Following the procedure described in Examples I and II, acetaldehyde was substituted for formaldehyde. The products obtained were tan in color and had Brookfield viscosity of 120 posies at 25°C.

Fourteen to eighteen parts of this hardener was mixed with 100 parts of an epoxy resin (eq. w. 190) and after curing, yielded an infusible epoxy resin with a Shore "D" hardness of 72 at 400°F.

EXAMPLE XIII

Four hundred and thirty-two grams of m-phenylenediamine, 432 gm. of water and 14 gm. of sodium hydroxide were placed in a liter three-neck flask equipped with a heating mantle, stirrer, thermometer, dropping funnel and vacuum distillation apparatus. The mixture was heated to 30°C. to dissolve m-phenylenediamine and 192 grams of furfural was added over a period of 30 minutes. After the final addition of furfural, the mixture was stirred for an additional 30 minutes at a temperature of 30°–35°C. The mixture was phase separated in a liter separatory funnel, and upper aqueous alkaline solution was discarded. The lower resinous liquid portion was distilled under reduced pressure of 45 mm mercury to a pot temperature of 150°C. over a period of one and one-half hours.

The product obtained was a dark brown colored hardener and had a Brookfield viscosity of 120 poises at 25°C. Additional heating of this curing agent yielded a more viscous resinous curing agent, also capable of curing epoxy resins.

Nineteen to twenty-two parts of this hardener was mixed with 100 parts of an epoxy resin (eq. w. 190) and cured at 400°F. to an infusible epoxy resin, to produce a casting having a heat distortion temperature of 350°F. and a Shore "D" hardness of 72 at 400°F.

The curing agent of this example, as well as the higher viscosity material, were both far superior to the unreacted aromatic amines in yielding high heat distortion products when curing epoxy resins.

EXAMPLE XIV

One hundred parts by weight of 3,4-epoxy-6-methyl cyclohexylmethyl, 3,4-epoxy-6-methyl cyclohexane carboxylate and 16 to 18 parts of hardener prepared as in Example I, were thoroughly mixed and heated for 15 hours at 200°F., one hour at 300°F., one hour at 400°F., plus one hour at 500°F. The mixture cured to a hard, infusible mass with a Shore "D" hardness of better than 90 at 500°F., and heat distortion temperature well above 500°F. Substantially identical results were obtained when the hardeners prepared in Examples II, V and VIII were substituted for that from Example I.

EXAMPLE XV

One hundred parts of vinyl cyclohexene dioxide and 18 to 20 parts of hardener prepared as in Example I were thoroughly mixed and cured at 500°F. to obtain a product similar to Example XIV. The same results were obtained when using the hardener prepared in Examples II, V and VIII.

EXAMPLE XVI

One hundred parts of an epoxy resin derived from bisphenol A and epichlorohydrin, having an epoxy equivalent of about 190, was mixed with 12 to 15 parts of hardener prepared as in Example I. The combination was mixed with various mineral reinforcing powders, such as 325 mesh mica (up to 100%), finely ground titanium dioxide (up to 100%), etc. and cured at 150° to 300°F. until hard, dense, infusible castings were produced. Improved high temperature mechanical properties were obtained by post curing at 400° to 500° or higher.

There are many advantages in my invention, which will be apparent from the foregoing description and the illustrative examples. For the first time an oxidation resistant and thermally stable epoxy resin composition is provided which has a relatively long working life, which may be rapidly cured and post-cured to produce high thermal stability and strength at elevated temperatures. My curing agent is liquid, generally light in color, does not have to be pre-melted to be mixed into the epoxy resin, and there is no loss of working life, due to heating as used in the old art, to get a uniform mixture with the epoxies, prior to the final curing which is marked advance in the art.

I claim:

1. The process for making a liquid curing and hardening agent for epoxide resin compositions comprising the steps of
   1. dissolving an aromatic polyamine selected from the group consisting of m-Phenylene diamine, o-Phenylene diamine, p-Phenylene diamine, 2,5-Diaminotoluene, 1,3-Diaminotoluene, 1,8-Diaminonaphthalene, 4,4'-Methylene dianiline, p-Chloro-o-phenylene diamine, 2,4-Diaminodiphenylamine, 4,4'-Diaminophenylether, 4,4'-Diamino diphenyl sulfone, 4,4'-Diamino benzophenone, 4,4'-Diamino diphenylamine, in a solvent selected from the group consisting of water, isopropyl alcohol, dilute aqueous acid, and dilute aqueous caustic alkali;
   2. adding an active aldehyde compound selected from the group consisting of Formaldehyde, Acetaldehyde, Propionaldehyde, Butylaldehyde, n-Valeraldehyde, Caproaldehyde, Caprylicaldehyde, Acrolein, Crotonaldehyde, Tiglic aldehyde, to said solution, the molal ratio of polyamine to aldehyde being in the range from 3/4:1 to 5:1, and maintaining the temperature in the range from 25° to 100°C. until the reaction is complete;
   3. removing the water from the reaction mixture;
   4. adding an aromatic diamine in equal molal proportion to that used in the initial reaction in steps 1 and 2; and
   5. removing the water from the reaction mixture of step 4 by heating under reduced pressure to a temperature of about 150°C. for a period of about one-half to four hours.

2. The process defined in claim 1 in which the aldehyde is formaldehyde.

3. The process defined in claim 2 in which the aldehyde is dissolved in an approximately equal amount of methanol.

4. The process defined in claim 1 in which the aldehyde is acetaldehyde.

5. The process defined in claim 4 in which the aldehyde is dissolved in an approximately equal amount of methanol.

6. The process defined in claim 1 in which the aldehyde is formaldehyde, and the aromatic polyamine is m-phenylene-diamine.

7. The process defined in claim 1 in which the aldehyde is formaldehyde, and the aromatic polyamine is O-phenylene diamine.

8. The process defined in claim 2 in which the reaction solvent is isopropyl alcohol.

9. The process defined in claim 1 in which the aldehyde is formaldehyde and the aromatic amine is p-phenylene diamine.

* * * * *